July 28, 1964
JEAN-PIERRE LEROUX  3,142,755
METHOD OF DETERMINING TEMPERATURE BY MEANS
OF A PHOSPHORESCENT SUBSTANCE, AND
MEASURING APPARATUS FOR THE
EMPLOYMENT OF SAID METHOD
Filed Dec. 13, 1960
3 Sheets-Sheet 1
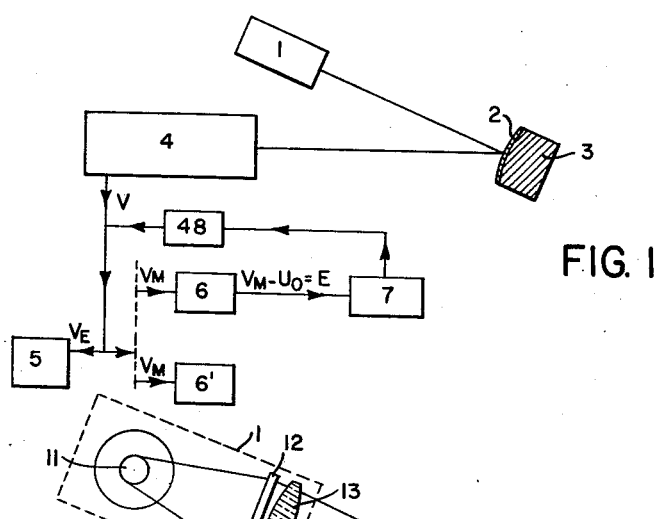
FIG. 1
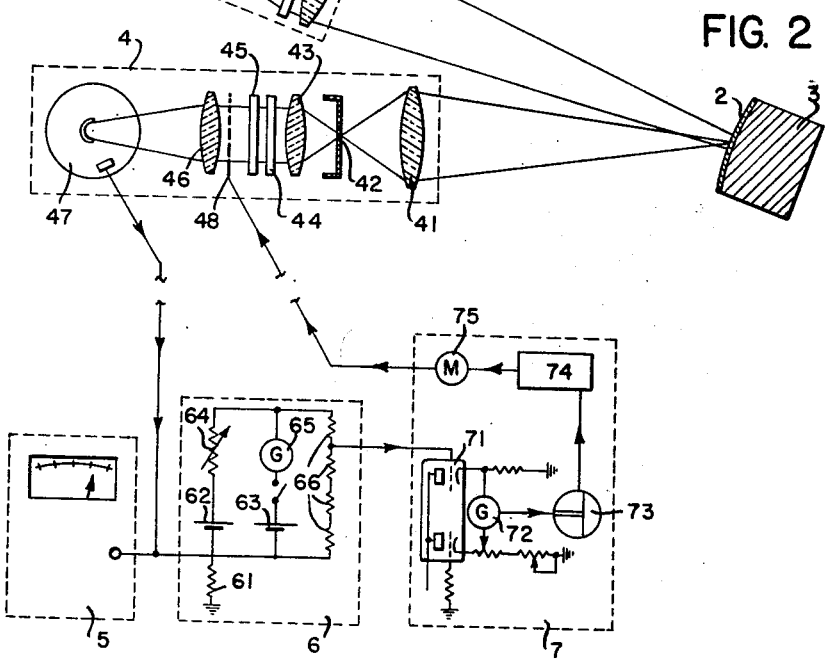
FIG. 2
FIG. 3
INVENTOR
JEAN-PIERRE LEROUX
BY *Norman L. Montague*
ATTORNEY July 28, 1964   JEAN-PIERRE LEROUX   3,142,755
METHOD OF DETERMINING TEMPERATURE BY MEANS
OF A PHOSPHORESCENT SUBSTANCE, AND
MEASURING APPARATUS FOR THE
EMPLOYMENT OF SAID METHOD
Filed Dec. 13, 1960   3 Sheets-Sheet 2

INVENTOR
JEAN-PIERRE LEROUX
BY *Vernon L. Montague*
ATTORNEY

July 28, 1964
JEAN-PIERRE LEROUX
3,142,755
METHOD OF DETERMINING TEMPERATURE BY MEANS
OF A PHOSPHORESCENT SUBSTANCE, AND
MEASURING APPARATUS FOR THE
EMPLOYMENT OF SAID METHOD
Filed Dec. 13, 1960
3 Sheets-Sheet 3
FIG. 8
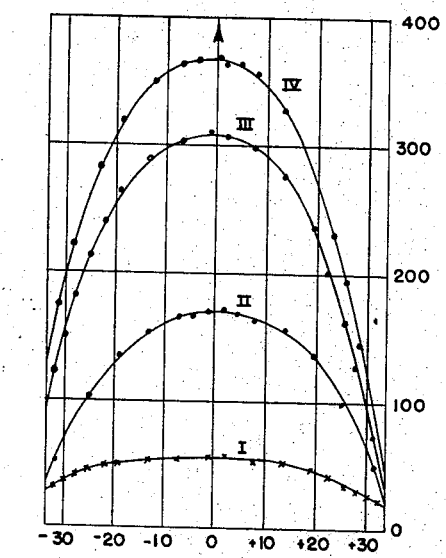
FIG. 10
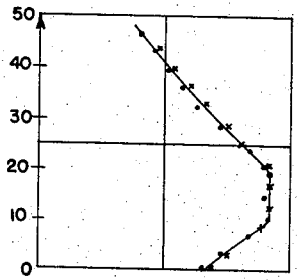
FIG. 11
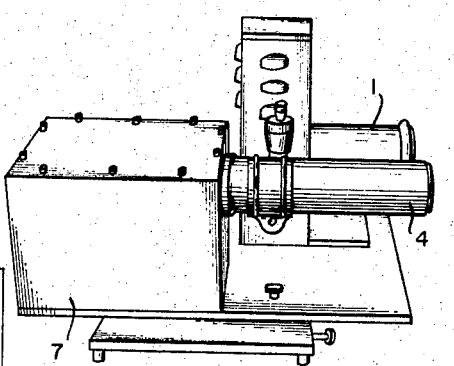
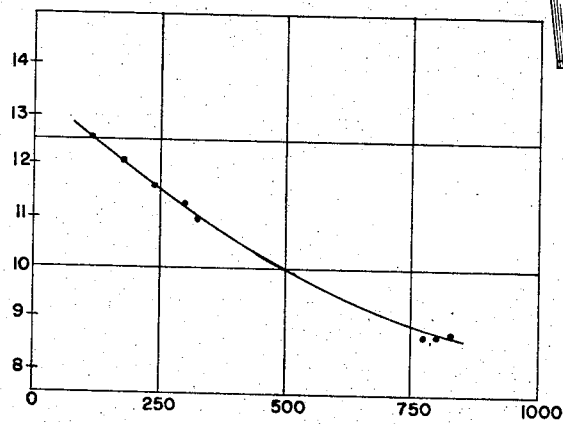
FIG. 9
INVENTOR
JEAN-PIERRE LEROUX
BY *Homer R. Montague*
ATTORNEY

United States Patent Office 3,142,755
Patented July 28, 1964

3,142,755
METHOD OF DETERMINING TEMPERATURE BY MEANS OF A PHOSPHORESCENT SUBSTANCE, AND MEASURING APPARATUS FOR THE EMPLOYMENT OF SAID METHOD
Jean-Pierre Leroux, 1 Place Montierneuf E.N.S.M.A., Poitiers, France
Filed Dec. 13, 1960, Ser. No. 75,545
8 Claims. (Cl. 250—71)

A method is already known for the visual estimation, determination, and photographic recording of the temperatures at the surface of a solid body, and which method utilizes the variations, under the influence of temperature, of the brilliance or color of the luminous emissions of substances placed in contact with the material whose temperature is to be estimated or determined.

Such estimation or determination can be performed by processes of visual or photographic photometry, or by a photoelectric device. The excitation of the luminescence is brought about by appropriate radiation (ultraviolet, for example); its intensity, which must be known, is preferably uniform all over the luminescent substance. The process then consists in comparing the intensity of all or part of the luminous emission corresponding to an unknown temperature, to another luminous intensity serving as a standard. However, this process does not permit obtaining precise measurements, and it requires repeated calibration.

A related procedure which is known utilizes the spectral shifts due to temperature, of the luminous emissions of substances raised to the temperature which it is desired to measure. The luminescence is usually excited by ultraviolet radiation, whose intensity at the irradiated area of the luminescent substance under examination has to be evaluated. The temperature-sensitive parameter that is used is the quotient of the emitted luminous intensities corresponding to two spectral bands, narrow or wide, taken from the emission spectrum, to within a certain factor which is defined by the instrument used.

For the utilization of the above method, the quotient of luminous intensities is converted into a quotient of two photoelectric currents, whose evaluation is calibrated according to the temperature for a given intensity of excitation. This last condition is related only to those substances which are not purely fluorescent.

In contrast to the above process, one of the aims of the present invention is to obtain a precise method for the determination of a temperature, and to this end it is based on the luminous energy emitted by a phosphorescent substance raised to this temperature.

Another aim of the invention is to excite the fluorescent substance continuously by an energy whose value is a periodic function of time.

Another aim of the invention is to deduce the temperature of such substance from the deformations presented by the periodic time function corresponding to the luminous emission as a function of the temperature. These deformations are to be determined, in accordance with this invention, either by the phase shift existing between the function representing the exciting energy and a function corresponding to the phosphorescent emission, or by a thermosensitive parameter to be equal or in proportion to the relationship between the effective value of the alternating component of the periodic time function corresponding to the luminous radiation, and the mean value of this same periodic function.

Another aim of the invention is to make possible the direct determination of the parameter resulting from the quotient between the effective value of the alternating component of the periodic function corresponding to the luminous radiation, and transforming, if desired, by the mean value of this same periodic function, said luminous radiation into a photoelectric signal.

Another aim of the invention is to construct a servo device making it possible, without modifying the value of the parameter, to modify the value of such photoelectric signal obtained from the luminous emission, in order to bring the mean value of the periodic function back to a comparison value and keep it there, which makes it possible to obtain directly the parameter resulting from the quotient between the effective value of the alternating component and the mean value of this same periodic function.

Another object of the invention is to create, by calibration, a set of curves applicable to a given phosphorescent substance for a given source of excitation, and for a given optical filtering of the emission of that substance, which makes it possible to determine a temperature by mere reading, and by the function of a single parameter.

Other purposes and advantages of the invention will be apparent from the annexed description, the claims appearing at the end of the description, and the appended drawings, in which:

FIG. 1 is a block diagram of one embodiment of the apparatus for the determination of temperatures.

FIG. 2 represents schematically the arrangements making it possible, first of all, to excite the luminous substance with an energy whose value is a periodic function of time, and then to transform the phosphorescent emission thus obtained into a photoelectric current.

FIG. 3 represents one form of electric circuit for obtaining directly the value of the parameter P formed by the relationship between the effective value of the alternating component of the periodic time function representing the photoelectric current obtained by the luminous radiation, and the mean value of this same periodic function.

FIG. 8 is a diagram representing the distribution of temperatures along a strip of metal heated by the Joule effect.

FIG. 9 is a diagram relating to the measurement of the coefficients of forced convection in an annular space.

FIG. 10 is a diagram representing the results of one determination of surface temperatures on the glass bulb of an electron tube.

FIG. 11 is a perspective view of an example of a physical embodiment of an apparatus for the determination of temperatures according to the invention.

Figure 4A:
FIG. 4a is an oscillogram representing the exciting energy.

From the general point of view, the particular device making it possible to find the temperature may comprise the following principal parts, as shown in FIG. 1: a source of excitation 1 producing a modulated light beam which is directed to the phosphorescent substance 2 appropriately mounted upon the element or material 3 whose temperature is to be determined, and a receiving device 4 constituted by (see FIG. 2): (a) an optical system receiving the periodic phosphorescent emission and comprising all the appropriate members (lenses and optical filters) for the purpose of selecting the desired spectral portion of that emission; and (b) devices for transforming the phosphorescent emission into a periodic photoelectric signal V (photoelectric cells or electron photomultiplier).

Beginning with this signal V, the thermosensitive parameter P is defined by the formula:

$$P = \frac{\text{Effective value of the alternating component of } V}{\text{Average value of } V} = \frac{V_E}{V_M}$$

Measuring instruments make it possible to obtain:

*Either* each of the terms of the ratio $V_E/V_M$ (such as by apparatus 5 for the measurement of $V_E$, and 6' for the measurement of $V_M$)

*Or*, directly, a quantity equal or proportional to P, readable at 5, provided the value of $V_M$ is then kept equal to a constant known value $U_0$ by means of the servo devices 6, 7 and 48.

So, when $V_M = U_0$ being known and fixed, we know the value of P by reading, at 5, $V_E = PV_M = PU_0$.

The principle of operation of the servo system is as follows: The system 6 picks off from $V_M$ the value $U_0$, and system 7 amplifies the difference $V_M - U_0 = e$, the error or unbalance voltage; and if $e$ is not zero, a driving device acts through the medium of system 48 upon the value of the output signal V, that is, on $V_E$ and $V_M$ in such a manner as to cancel the unbalance signal $e$ without modifying the value of P.

GENERAL CONSIDERATIONS

The following considerations make it possible to generalize the apparatus according to the invention. It is known that the phenomenon of phosphorescence inherent in certain substances subjected to an appropriate excitation depends upon the temperature to which the substance is raised.

This process consists essentially, therefore, in raising a phosphorescent substance to the temperature which one desires to determine, exciting the said substance in a permanent manner by any appropriate means supplying energy whose value is a periodic function of time, using the luminous energy emitted by the phosphorescent substance to determine the temperature, the temperature being deduced from the deformations found in the periodic function corresponding to the phosphorescent emission, which depend on the variations of temperature.

Among the "deformations" that can be used, according to the invention, there is the phase difference between the function representing the exciting energy and the function corresponding to the phosphorescent emission. As a thermosensitive parameter for the determination of temperature, there is also the relationship $P = E/M$ between the effective value E of the alternating component of the peirodic time function corresponding to the phosphorescent radiation, and the mean value M of this same periodic function.

The particular embodiment described above relates to a device utilizing this latter parameter for the determination of temperature. In practice, the measurement of this ratio, $P = E/M$, or of its inverse, $M/E$, is performed by transforming the luminous energy of phosphorescence, by means of known devices, into a photoelectric current from which P is determined. In general, the evolution of the thermosensitive parameter P in relation to temperature also depends on certain experimental conditions, particularly the average intensity of excitation and the surface density of the phosphorescent substance used.

The evolution of P according to the temperature can be interpreted graphically by one and the same system of curves, which will be determined beforehand by calibration under various experimental conditions. This calibration grid will be established and valid: (a) for a given luminescent substance, (b) for a given source of excitation and (c) for a given optical filtration of the emission of this substance. Such a calibration grid will make it possible to determine a temperature by the following process:

For a given set of experimental conditions (a certain spot area of luminescent substance under examination, subjected to a certain excitation which it is useless to evalute), it will be necessary:

(1) To measure the value $P_0$ of the thermosensitive parameter at a known temperature $T_0$ (ambient temperature, for example). The knowledge of $P_0$ and $T_0$ defines the curve of the calibration grid or chart that corresponds to the given experimental conditions.

(2) Without changing these conditions, to measure the value P of the thermosensitive parameter when the spot of phosphorescent substance is raised to the temperature which it is desired to measure.

From the knowledge of the curve in the calibration grid, and of the value of P, the corresponding temperature is directly deduced; a concrete example of the application of this process will be given later on in this text.

According to this process, all mineral and/or organic phosphorescent materials can be used, which are stable at the temperature which it is desired to determine, and particularly the following compounds, taken separately or in mixtures, such as: sulfides or selenides of zinc, sulfides or selenides of cadmium, mixed sulfides or selenides of zinc and of cadmium, calcium sulfides, tungstates, willemites, etc.

According to the physical state of the substance whose temperature is to be determined, the phosphorescent substance is placed in contact with the said substance by the appropriate known techniques.

The periodic exciting energy that provokes the periodic phosphorescent emission may be of any kind, and may be rendered periodic to this end either by modulation of the energy emitted by a constant energy source, or by a source whose energy is itself modulated. In particular, the energy source may be ultraviolet rays, X-rays, and particle (corpuscular) rays.

A device making it possible to detect, by direct reading, a quantity equal or proportional to the parameter P is represented in FIGS. 1, 2, and 3; the device is composed of a source of excitation 1, comprising a high-pressure mercury vapor lamp 11 supplied by the power mains at 50 cycles per second, for example. Its emission is filtered by a thick Wood glass 12, and then is concentrated by the lens 13 onto the luminescent substance 2.

Figure 4B:
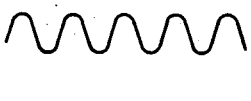
FIGS. 4b and 4c are oscillograms representing the modulated luminous emissions obtained for different temperatures (20° C. and 350° C., respectively).
Figure 4C:
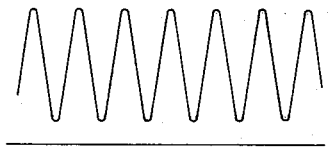

The intensity of excitation received by the substance is thus modulated at a frequency of 100 cycles per second; FIG. 4 is an oscillogram representing the modulation. This excitation provokes an emission of luminescence modulated at the frequency of 100 cycles per second, the form of which depends on the temperature to which the substance 2 is raised. The oscillaagrams 4b and 4c represent an example of such emission for temperatures of 20 and 350° C. (the average value of the emission is, in fact, about 10 times weaker at 350° C. than at 20° C.).

The receiving device 4 comprises (FIG. 2) an inlet slot 42 receiving the image given by lens 41 of the portion of luminescent substance examined; then lens 43 forms a parallel beam of light to pass through an optical filter 44 and an absorbent glass 45 designed to filter out completely the ultraviolet radiation diffused by the substance.

A lens 46 finally gathers the luminous energy onto the photocathode of an electron photomultiplier 47.

The device for measurement and control is constituted by the elements 5, 6, 7, and 48 in FIG. 1. The photoelectric current issuing from the anode of the photomultiplier 47 (FIG. 3) passes through the load resistance 61, at the terminals of which the useful potential difference V is obtained.

System 5, for example, is a low-frequency electronic millivoltmeter that indicates the value $V_E$ (effective value of the alternating component of V).

In addition to the load resistor 61, system 6 comprises an assembly that makes it possible to tap off from the voltage V a voltage $U_0$ obtained, for example, from a stable source of direct current 62, a fraction of which is compared to the electromotive force of a standard battery 63, by means of a zero-center galvanometer 65 and two resistances or sets of resistances 64 and 66.

The difference, $V_M - U_0 = E$ is applied to one of the grids of a dual triode 71 assembled with cathode resistors, between the cathodes of which a zero-center galvanometer 72 is placed (which serves as a low-pass filter and is insensitive to the alternating component of V at 100 cycles per second). The equilibrium of this galvanometer indicates when $U_0$ and $V_M$ are equal; when this equilibrium is reached, the light spot is centered on a fixed photoresistance cell 73 of the light spot follower type. Inequality of the values of $V_M$ and $U_0$ results in a deflection of the light spot of galvanometer 72, and consequently in the appearance of a signal issuing from cell 73. This signal, through the medium of the amplifier 74, sets into rotation a motor 75 which causes the displacement, in a suitable direction, of a screen 48 for attenuating the beam of light.

The value of the output signal V of the photomultiplier is thus corrected until $V_M$ is again equal to $U_0$. It should be observed that the over-all attenuation of the light beam does not affect the value of the parameter $P = V_E / V_M$.

The attenuating screen should have a transmission factor that is independent of the wavelengths involved in the illumination of the photomultiplier 47. A blackened metal grid or comb is used. The members 73, 74, 75 are part of a "spot follower" of industrial manufacture, so they can be replaced by an operator who, before taking the reading at 5, will operate screen 48 to bring the galvanometer 72 to its position of equilibrium.

When $U_0$ is known, this device makes it possible to know within a precision of 1% the value of the parameter P, to follow its evolution, and thus to determine the temperature of a system and the variation of said temperature.

In order to calibrate the apparatus, the procedure is preferably the following: Thin coatings of phosphorescent substances are placed on small aluminum disks. The average thickness of these coatings is generally on the order of a few hundredths of a millimeter, the surface density running, then, from 2 to 12 milligrams of phosphorescent product per square centimeter. The product is made to adhere by means of a synthetic resin.

Each of these disks is appropriately disposed in a suitable metal crucible, in contact with the junction of a precise thermocouple making it possible to determine the temperature. The assembly is placed in a carefully insulated electric furnace.

The apparatus represented in FIG. 2 is aimed at a point on the phosphorescent product. The value of the thermosensitive parameter selected is determined in relation to the temperature, and the corresponding calibration curve is traced. The same operations are repeated, at various intensities of excitation and surface densities. Finally, a set of curves is obtained that is essentially dependent upon the phosphorescent product used, the assembly of filters, and the source of excitation. For this purpose, in fact, it is necessary that the exciting energy, of which an oscillogram is presented in FIG. 4, be of a well-defined form, that is to say, that the effective value of the alternating component of the excitation energy divided by the mean value of the excitation energy produce a very substantially constant quotient (within a few percentage points). This condition is well met by using always the same type of mercury vapor lamp as exciting source.

The set of curves may consist of a variable number of curves; it is valid for:

A given substance
A given source of excitation
A given assembly of filters 44–45

Figure 5:
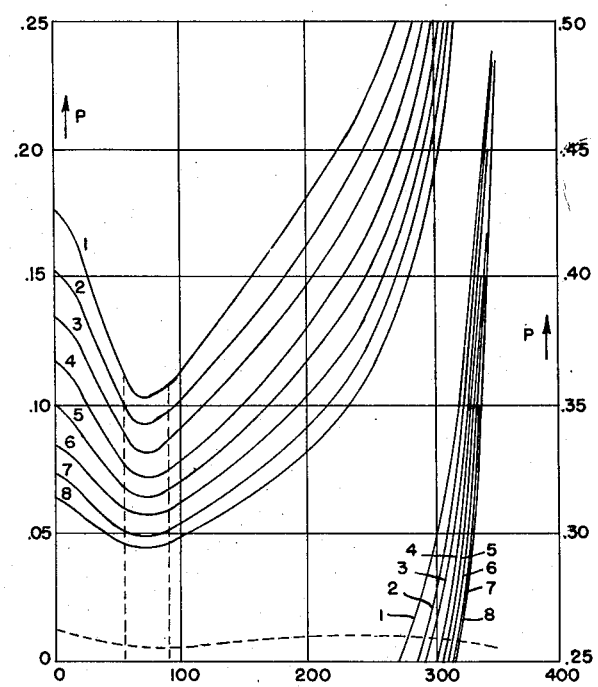
FIGS. 5 and 6 represent calibration grids obtained with phosphorescent substances made of zinc sulfide activated by copper.
Figure 6:
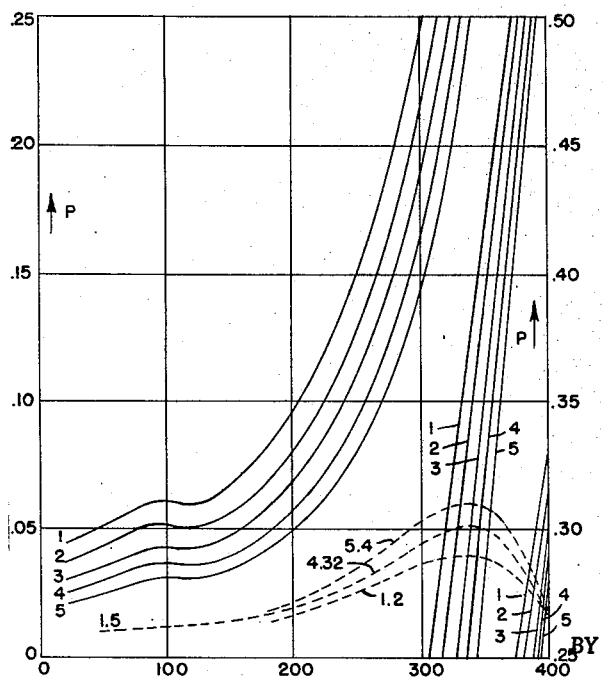
Figure 7:
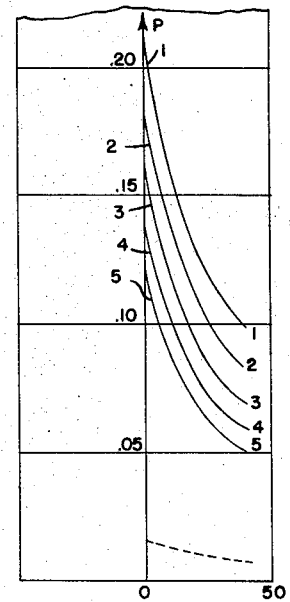
FIG. 7 represents a diagram, similar to FIG. 5, obtained with a substance made of a mixed zinc-cadmium sulfide activated by copper.

FIGURES 5, 6 and 7 give three examples of sets of curves relative to two zinc sulfides activated by copper, and one mixed zinc-cadmium sulfide, also activated by copper. All these substances are used with the same optical filters (bandwidth 65 millimicrons).

With each set of curves there are connected one or more interpolation curves to facilitate the analysis of the measurements. Assuming that the ambient temperature $T_o$ is 20° C., and that the value of the parameter $P_o$ is equal to 0.119 and that at the unknown temperature T the value of the parameter P may be 0.192, the point $T_o = 20°$ C., $P_o = 0.119$ defines a certain curve on the grid situated between curves 3 and 4.

Let us determine the unknown temperature T: in relation to the curve 3: $\Delta P_o = -5$ mm.; for $P = 0.192$, and according to the interpolation curve $\Delta P = -5$ mm., hence $T = 261°$ C. If we operate in relation to curve 4, $\Delta P_o = +12.5$ mm. and $\Delta P = +12.5$ mm., and we find $T = 260°$ C.

The effective accuracy of the finding of a temperature is the following:

On the basis of the grid in FIG. 5:
  Between +15 and +55° C. Possible error 2° C.
  Between +90 and +350° C. Possible error 4° C.
On the basis of the grid in FIG. 6: between +150 and +400° C. Possible error 4° C.
On the basis of the grid in FIG. 7: between 0 and +40° C. Possible error 1° C.

The scanning apparatus comprises systems 1 and 4 assembled on a metal base. It is supported on a tripod with two racks which greatly facilitates the exploration of a surface (FIG. 11). A retractable total-reflection prism permits the easy focusing of all the sightings. It is easy to examine areas of a few square millimeters of surface at distances varying from 10 to 150 cm. The spots of coating placed for example with a brush on a solid surface have an average thickness not exceeding 2- or 3-hundredths of a millimeter.

The measurements can be performed in a moderately bright room having artificial lighting, without impairing their precision; they can also be made through any optical system, providing its transmission factor in the ultraviolet region is sufficiently high. The phosphorescent emissions used have sufficient intensity to maintain, regardless of the temperature, an average photoelectric current of 1 microampere, for a photomultiplier such as the RCA 1P21 with a power supply of 700 volts.

It should be noted that the use of this method does not require a knowledge of the level of excitation received by the phosphorescent substance, nor of the regularity or uniformity of the deposit of the latter.

The applications of this method and apparatus are manifold. They can be used for the determination of temperatures of electrical conductors, surface temperatures in wind tunnels or in the open air, on all solid materials, regardless of the shape or state of their surfaces. Typical applications include thermal and aerothermal measurements in research or industrial laboratories, measurements of temperature rise in electron tubes, transistors, wound or carbon coated resistances, measurements in insulating materials (plastics, glass, cement et cetera) and so on. The use of the method is facilitated by the ease of depositing and removing the coatings, leaving the object undamaged.

The method and apparatus as described can be used for the determination of temperature in different cases. By way of example, and without thereby limiting the scope of the invention, three instances of such application are here given:

(a) Distribution of Temperature Along a Strip of Metal Heated by the Joule Effect The strip of metal is 2 mm. wide, 0.1 mm. thick and 67.5 mm. long, and it is soldered at its extremities to 2 copper rods 4.5 mm. in diameter. Four series of measurements have been performed, the temperatures at the center of the strip varying from 55 to 367° C. On the basis of each temperature distribution obtained (FIG. 8) and of the knowledge of the temperature coefficients of the strip, it was possible to determine the total resistance $Rc$ of the strip by means of graphic integrations. A Thomson's bridge measurement has, on the other hand, yielded the value $Rm$ of the latter. The following table shows the results obtained:

|  | Rc (ohms) | Rm (ohms) |
|---|---|---|
| Curve I | 0.0446 ±0.0006 | 0.0447 ±0.0001 |
| Curve II | 0.0563 ±0.0008 | 0.0575 ±0.0005 |
| Curve III | 0.0715 ±0.0013 | 0.072 ±0.0005 |
| Curve IV | 0.078 ±0.0013 | 0.0785 ±0.0005 |

(b) Measurement of Coefficients of Forced Convection in an Annular Space

The annular space through which a current of air flows consists of a central cylinder formed of a thin tube (thickness 0.1 mm.) of stainless steel, heated by the Joule effect, and located inside of a tube of transparent silica making it possible to perform optical temperature readings on the central tube. Five series of measurements performed on phosphorescent coatings made it possible to obtain the values of the coefficient of convection $\alpha$ at wall temperatures between 120 and 350° C. (FIG. 9). With this same set-up, and with the aid of a monochromatic optical pyrometer, measurements give values of $\alpha$ at temperatures in the neighborhood of 800° C. (FIG. 9). The coherent unity of these results is confirmed by various considerations (Faure and J. P. Leroux: "On the Experimental Selection of the Specific Parameters of the Fluid in Exchanges of Heat by Convection," Comptes Rendus de l'Academie des Sciences, Tome 250, p. 3602, 1960).

(c) Determination of Surface Temperatures on the Glass Envelope of an Electron Tube The operating temperature of electron tubes is an important factor in their useful life; in particular, excessively high bulb temperatures can give rise to cracks that damage the tubes permanently. The results set forth in FIG. 10 relates to an EL41 pentode used in the following conditions:

Position vertical: cooling natural
Heater voltage: 6.3 volts
Screen voltage: 250
Plate voltage: 250
Plate current: 34 ma. (for bias voltage of 7 volts)

Two readings on the same tube were performed at an interval of several months (FIG. 10).

These three examples show the possibilities of the method, and of the instruments or apparatus, in particular fields in which more customary procedures fail or are very difficult to use. However, it is to be understood that the invention is not to be limited to the details of such examples, but only by the true scope and meaning of the appended claims.

What is claimed is:

1. A process for the precise determination of temperatures, comprising the steps of exposing to the temperature to be measured a phosphorescent material, continuously irradiating said material with exciting energy whose intensity is a varying periodic function of time, sensing the variations in the intensity of the excited phosphorescence, and calculating the temperature of the material from the relationship of the sensed variations to the periodic function governing said irradiation.

2. A process for the precise determination of temperatures, comprising the steps of exposing to the temperature to be measured a phosphorescent material, continuously irradiating said material with exciting energy whose intensity is a varying periodic function of time, sensing the variations in the intensity of the excited phosphorescence, and calculating the temperature of the material from the phase relationship of the sensed variations to the periodic function governing said irradiation.

3. A process for the precise determination of temperatures, comprising the steps of exposing to the temperature to be measured a phosphorescent material, continuously irradiating said material with exciting energy whose intensity is a varying periodic function of time, sensing the variations in the intensity of the excited phosphorescence, and calculating the temperature of the material from the form factor of the sensed variations.

4. A process for the precise determination of temperatures, comprising the steps of exposing to the temperature to be measured a phosphorescent material, continuously irradiating said material with exciting energy whose intensity is a cyclical function of time, sensing the variations in the effective (R.M.S.) and absolute mean values of the resulting alternating intensity of the phosphorescent emission, and calculating the temperature of the material from the ratio of said values.

5. Apparatus for the precise measurement of temperature of the type in which a phosphorescent material is applied to a body and subjected to a phosphorescence-exciting energy to produce a luminous output which is a function of the temperature of said material; said apparatus including: means for projecting upon such material a beam of exciting energy whose intensity varies periodically with time, photoelectric means for sensing the resulting periodic variations in the intensity of the phosphorescent emission, and means responsive to a parameter of the function representing the current output of said photoelectric means for indicating the temperature of said material.

6. In an apparatus for the precise measurement of temperature, of the type in which a phosphorescent material is applied to a body and subjected to a phosphorescence-exciting energy to produce a luminous output which is a function of the temperature of said material, the improvement which comprises: means for projecting upon such material a beam of exciting energy whose intensity varies periodically with time, photoelectric means for sensing the resulting periodic variations in the intensity of the phosphorescent emission, and means for comparing the relative phase of the last-named variations with reference to the variations in said exciting energy.

7. In an apparatus for the precise measurement of temperature, of the type in which a phosphorescent material is applied to a body and subjected to a phosphorescence-exciting energy to produce a luminous output which is a function of the temperature of said material, the improvement which comprises: means for projecting upon such material a beam of exciting energy whose intensity varies periodically with time, photoelectric means for sensing the resulting periodic variations in the intensity of the phosphorescent emission, and means for calculating the ratio of the effective to the mean value of the periodic output current of said photoelectric means, to yield an indication of the temperature of said material which is independent of the absolute value of the exciting energy.

8. In an apparatus for the precise measurement of temperature, of the type in which a phosphorescent material is applied to a body and subjected to a phosphorescence-exciting energy to produce a luminous output which is a function of the temperature of said material, the improvement which comprises: means for projecting upon such material a beam of exciting energy whose intensity varies periodically with time, means for sensing the resulting periodic variations in the intensity of the phosphorescent emission, servo means for varying the output response of said sensing means to compensate for variations in the absolute amplitude of the exciting energy, and means responsive to the operation of said servo for indicating the temperature of said material.

References Cited in the file of this patent
UNITED STATES PATENTS
2,551,650   Urbach ---------------- May 8, 1951